(12) United States Patent
Leitner et al.

(10) Patent No.: US 6,390,499 B1
(45) Date of Patent: May 21, 2002

(54) GAS BAG ARRANGEMENT WITH A GAS GUIDE HOUSING COMPRISING PARTIAL DISCHARGE AREAS

(75) Inventors: Mario Leitner, Radegast; Werner Balser, Hamburg; Ulrike Hütte, München; Franz-Xaver Weiss, Dachau, all of (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/486,951

(22) PCT Filed: Aug. 28, 1998

(86) PCT No.: PCT/EP98/05463

§ 371 Date: Mar. 2, 2000

§ 102(e) Date: Mar. 2, 2000

(87) PCT Pub. No.: WO99/11493

PCT Pub. Date: Mar. 11, 1999

(30) Foreign Application Priority Data

Sep. 2, 1997 (DE) .......................................... 197 38 204
Dec. 19, 1997 (DE) .......................................... 197 57 125

(51) Int. Cl.[7] .......................... B60R 21/26; B60R 21/28
(52) U.S. Cl. ........................ 280/736; 280/740; 280/742
(58) Field of Search ................................ 280/737, 742, 280/738, 739, 740, 736, 741

(56) References Cited

U.S. PATENT DOCUMENTS 2,850,291 A * 9/1958 Ziccardi
3,618,980 A * 11/1971 Leising ........................ 280/736
3,810,655 A * 5/1974 Pracher ........................ 280/736
4,013,305 A * 3/1977 Ichihara ........................ 280/742
4,998,750 A * 3/1991 Werner ........................ 280/740
5,437,472 A * 8/1995 Kuretake ...................... 280/737
5,820,160 A * 10/1998 Johnson ........................ 280/736
6,152,484 A * 11/2000 Fischer ........................ 280/736
6,155,599 A * 12/2000 Bowers ........................ 280/740

FOREIGN PATENT DOCUMENTS

JP         406305391 A    * 11/1994

* cited by examiner

Primary Examiner—J. J. Swann
Assistant Examiner—David Divine
(74) Attorney, Agent, or Firm—R. W. Becker & Associates; R. W. Becker

(57) ABSTRACT

A gas bag arrangement for a motor vehicle safety system is provided. A gas generator is disposed in a housing to which is connected an airbag that is unfolded and inflated by gas produced by the gas generator and guided to a gas discharge area of the housing. A first partial discharge area of the gas discharge area is formed by a discharge part that projects from the housing into the airbag. A second partial discharge area is formed by openings disposed about a location where the discharge part is attached to the housing. Two partial flows of gas from the gas generator are separately directed, in the same direction, onto the material of the airbag. The first and second partial discharge areas are staggered relative to the airbag when viewed in a direction of discharge of gas from the housing.

10 Claims, 3 Drawing Sheets

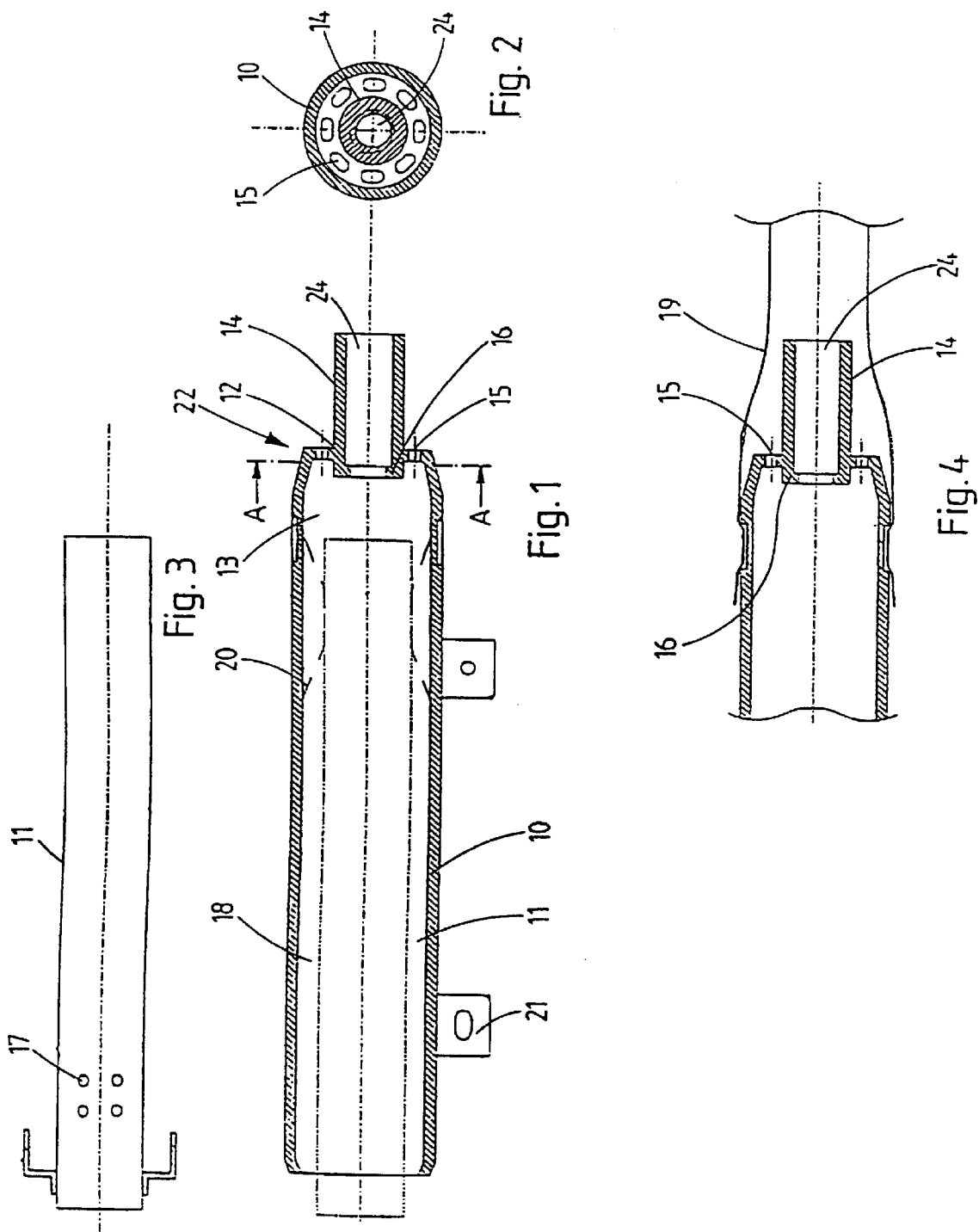

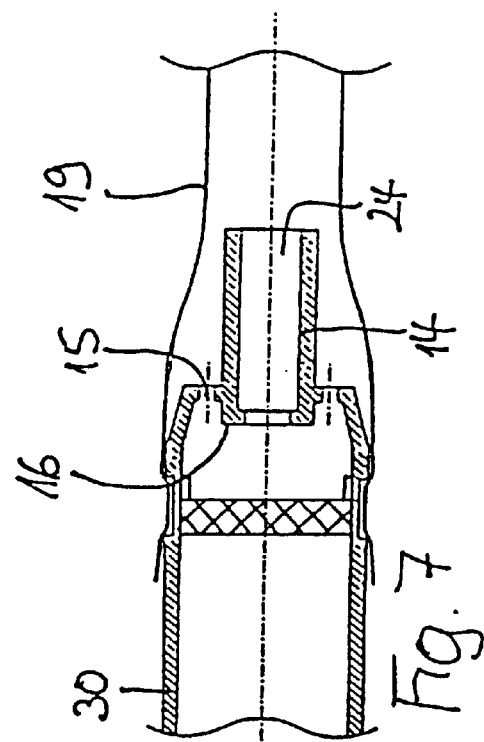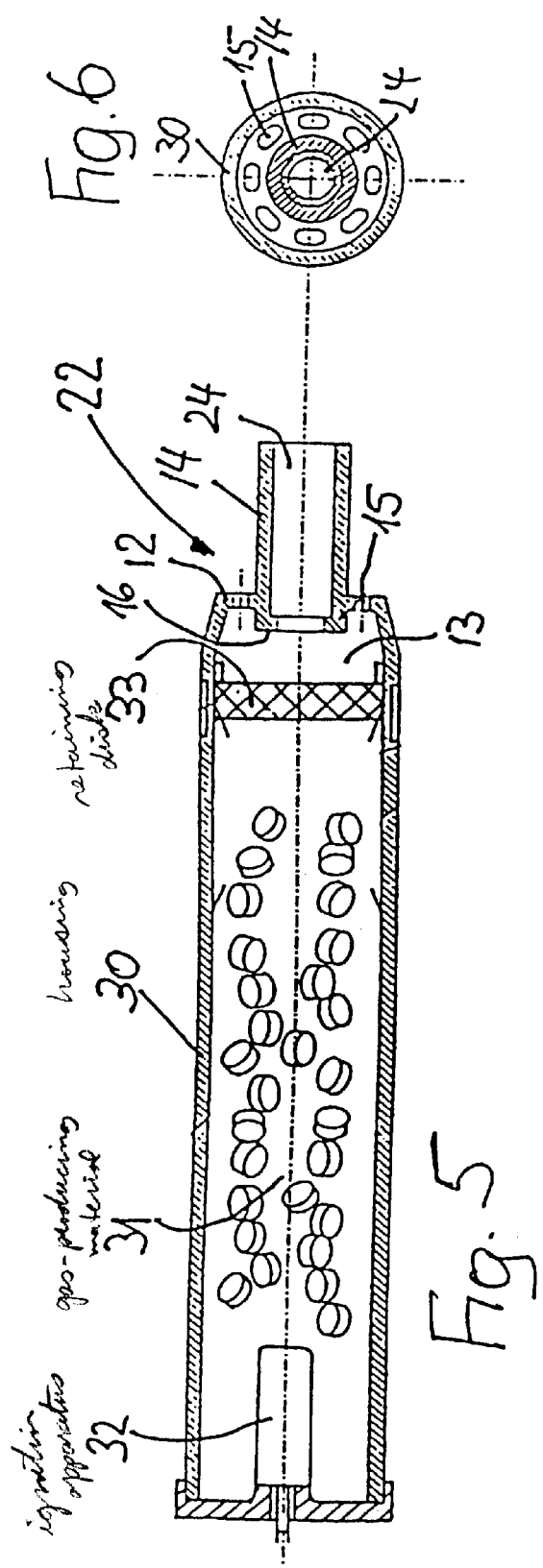

GAS BAG ARRANGEMENT WITH A GAS GUIDE HOUSING COMPRISING PARTIAL DISCHARGE AREAS

BACKGROUND OF THE INVENTION

The invention is a gas bag arrangement for a motor vehicle safety system comprising a gas generator and an airbag connected thereto that unfolds and becomes inflated by the gas produced by the gas generator when triggered, two partial gas flows exiting from the gas generator and acting separately upon the material of the airbag.

DE 21 50 744 C3 describes a gas bag arrangement with the aforesaid features; the gas generator described therein is set to generate at staggered intervals of time two partial gas flows, of which a first smaller partial gas flow initially pushes the airbag out of a container, while the partial gas flow released later in time inflates the airbag completely. Although such an embodiment reduces the risk of damage to the material of the airbag caused by a gas flow striking the material of the airbag at high pressure during the initial stage, pressure peaks still have a negative effect, especially in association with igniting the portion of fuel used to produce the quantity of gas for inflating the airbag.

The object of the invention is therefore to improve the protection of the material of the airbag from the gas flow striking it in a gas bag arrangement of the aforesaid type.

SUMMARY OF THE INVENTION

This object is achieved, including advantageous embodiments and further embodiments of the invention, using the contents of the claims following this specification.

Essentially the invention provides a housing that conducts the gas produced towards a gas discharge area, the gas discharge area of the housing constituting two partial discharge areas forming a single direction of discharge flow for the gas produced and arranged in staggered positions in the direction of gas discharged from said housing in relation to the connected airbag.

The advantage of the invention is that when the gas is produced, pressure peaks that occur due to baffling and dividing the gas flow produced in the housing are eliminated so that associated stress on the material of the airbag is reduced in that region of the airbag that connects to the gas discharge area of the housing. The staggered positions of the two points of discharge of the divided gas flow in the connected airbag lead to further protection of the material of the airbag. That is, the air located in the retention chamber is forced through the openings of the gas discharge area by the gas flow released at high speed and thus constitutes a cushion of air for the unfolding of the airbag.

The invention can be used particularly advantageously on gas bag arrangements in which the gas generator in the motor vehicle is arranged relative to physically separated airbags such that the gas flow, e.g., is conducted via a tubular connector to the airbag to be inflated, as described, e.g., in DE 296 05 896 U1 or GB 2 297 950 A for various applications. In this case, the connector tube is stressed in a particular manner, and this stressing of the connecting tube, which is also folded when at rest, is reduced in a particular manner in the invention.

In accordance with one exemplary embodiment of the invention it is provided that a first partial discharge area comprises a central discharge part that projects out of the gas conducting container and that extends into the airbag to be unfolded, and the second partial discharge area constitutes openings that are arranged in a circle surrounding the neck of the discharge part and that are situated in the wall of the housing. When the gas impacts, the air located in the retention chamber initially flows through the openings of the second partial discharge area and constitutes a cushion of air along the projecting discharge part. Not only does this cushion of air protect the unfolding of the connected regions of the folded material of the airbag, it also surrounds the partial gas flow flowing out of the discharge part and attenuates its direct contact with the material of the airbag.

Assuming symmetrical embodiment of the gas discharge area with the two partial discharge areas in the exemplary embodiment described in the foregoing, in accordance with an exemplary embodiment of the invention an arrangement can also be created in which the two partial discharge areas are arranged adjacent to each other within the walls of the housing in that a first partial discharge area comprises a discharge part that projects out of the housing in an asymmetrical arrangement and extends into the airbag to be unfolded and the second partial discharge area comprises openings arranged in the associated wall of the housing.

Using an application of the gas bag in accordance with DE 296 05 0896 U1 or GB 2 297 950 A, in one exemplary embodiment of the invention it is provided that the housing is tubular in shape and the gas discharge area is arranged at one end of the housing.

In accordance with one exemplary embodiment of the invention, the gas bag is drawn over the end of the tubular housing and fixed on the exterior of the housing.

In a first embodiment form of the invention it is provided that a separate gas generator for producing gas is arranged in the housing and that a retention chamber is formed in the interior of the housing between the gas generator and the gas discharge area. The advantage thereof is that pressure peaks produced when the gas generator is triggered are additionally reduced by means of additional deflection and also by the formation of the retention chamber in front of the gas discharge area.

In accordance with one exemplary embodiment of the invention, the occurrence of pressure peaks is further diminished in that the gas generator is provided with radial exit openings at its end that faces away from the discharge area, so that the gas the gas generator releases in the radial direction into the gas conducting container is deflected in an axial direction of flow before it discharges further through the gas discharge area of the gas conducting container.

In an additional exemplary embodiment of the invention it is provided that a gas-producing material is arranged directly in a section of the housing, wherein a retaining disk separates the gas-producing material and the gas discharge area from a retention chamber located in front of the gas discharge area. In accordance with other exemplary embodiments of the invention, this retaining disk can either merely fix the gas-producing material in the housing or can also comprise a burst function.

In addition, it can be provided that the housing comprises at its gas discharge area a baffle, or throttling, disk that faces the retention chamber, by means of which baffle disk pressure peaks that occur when the gas begins to discharge out of the housing can be additionally baffled (i.e., throttled).

BRIEF DESCRIPTION OF THE DRAWINGS

The drawings illustrate exemplary embodiments of the invention that are described in the following.

FIG. 1 is a longitudinal section of a housing with a gas generator arranged therein and a gas discharge area;

FIG. 2 illustrates a cross-section through Line A—A in FIG. 1;

FIG. 3 illustrates just the gas generator that is arranged in the housing;

FIG. 4 illustrates the gas discharge area of the housing in accordance with FIG. 1 with attached airbag;

FIG. 5 is a longitudinal section of the housing, as in FIG. 1, with gas-producing material arranged therein and gas discharge area;

FIG. 6 is a cross-section through Line A—A in FIG. 5;

FIG. 7 is the gas discharge area of the housing in accordance with FIG. 5 with attached airbag;

DESCRIPTION OF PREFERRED EMBODIMENTS

Figure 8:
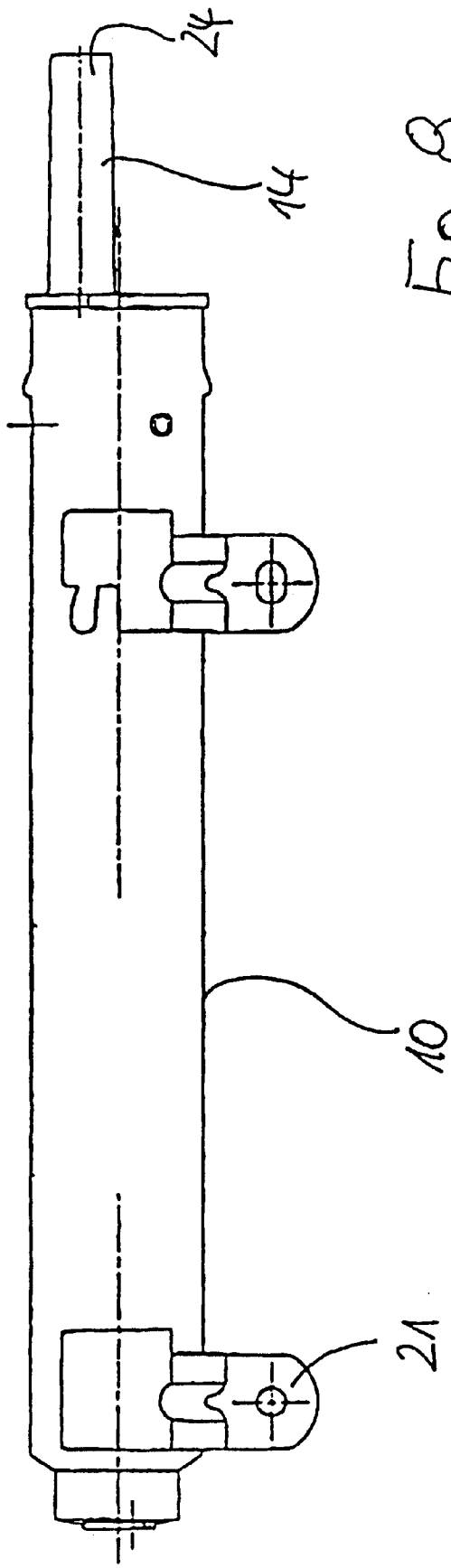
FIG. 8 is a side elevation of another exemplary embodiment of the housing illustrated in FIGS. 1 and 5 comprising an asymmetrical arrangement of the partial discharge area.

As can be seen in FIG. 1, the gas generator 11 belonging to a gas bag arrangement is arranged in the interior of a tubular housing 10 that is provided at one end 12 (which is also attached to the airbag 19, FIG. 4) with a gas discharge area 22. The gas generator 11 comprises at its side that faces away from the gas discharge area 22 radially arranged exit openings 17 through which, when the gas generator is ignited, the gas released thereby enters into the annular space 18 located between the gas generator 11 and the housing of the tubular housing 10 and here flows along the gas generator 11 in the direction of the gas discharge area 22. Located between the end wall 12 of the housing 10 and the end of the gas generator 11 is a space that constitutes a retention chamber 13.

The gas discharge area 22 arranged in the wall 12 comprises a central discharge part 14 that projects axially out of the housing 10 and that has at its free end a discharge opening 24 and furthermore comprises discharge openings 15 that are arranged annularly surrounding the discharge part 14 and that are situated in the end 12 of the housing 10. A baffle disk 16 is inserted facing the retention chamber 13 upstream of the gas discharge area 22 formed by the discharge part 14 and the discharge openings 15.

The gas generator 11 is fixed by means of individual compression ribs 20 in the interior of the cylindrical housing 10; the housing 10 can be affixed in the appropriate area of the motor vehicle by means of fasteners 21 located on its [the housing's] exterior.

As can be seen in FIG. 4, an airbag 19 is drawn over the end 12 of the cylindrical housing 10 and affixed to the exterior of the housing 10, e.g. by means of a hose band clamp attached here.

When the gas generator 11 is triggered, the gas released flows radially through the exit openings 17 out of the gas generator and is diverted by the housing 10 in the axial direction; in the region of the end 12, the gas flow meets the baffle disk 16 and is baffled here. The gas discharge area 22 comprising the discharge part 14 and the discharge openings 15 divides the gas flow into two partial gas flows that impact the airbag 19 at staggered positions and therefore at staggered intervals. The air initially located in the retention chamber 13 is displaced by the gas flowing in and enters the folded airbag 19 especially through the discharge openings 15 and unfolds it. It prevents hot gas from striking the material of the airbag directly. The axially-flowing flow of air simultaneously surrounds the gas flowing out from the discharge part 14 and thereby acts as a cushion of air and likewise attenuates the direct contact between the gas flowing out of the discharge opening 24 of the discharge part 14 and the material of the airbag.

The two partial gas flows can be controlled by contriving the geometry of the discharge openings 15 and of the discharge part 14, the discharge openings 15 filling the rear region of the airbag that faces the housing 10, while the gas flowing through the discharge part 14 flows accordingly into the front region of the airbag 19.

The exemplary embodiment illustrated in FIGS. 5 through 7 is distinguished from the foregoing exemplary embodiment, which related to FIGS. 1 through 4, only in that arranged directly in the housing 30 is a quantity of gas-producing material 31, so that the housing 30 with material 31 it self acts as gas generator. An ignition apparatus 32 projects into the housing 30 from one end, while attached at the end 12 of the housing 30 opposite the ignition apparatus 32 is the gas discharge area 22 with the airbag 19 attached thereto. The gas-producing material 31 is separated from the gas discharge area 22 by means of a retaining disk 33 that is arranged spaced therefrom and that forms a retention chamber 13.

In addition, the design of the gas discharge area 22 comprising the baffle disk 16 facing the retention chamber 13 corresponds to the description already provided for FIGS. 1 through 4. When the gas-producing material 31 is triggered in the gas generator housing 30, the gas released flows in the direction of the end 12 and initially destroys the retaining disk 33, whereupon the flow of gas strikes the baffle disk 16 and from this point on is divided into two partial gas flows in the manner described and flows into the airbag 19.

Figure 9:
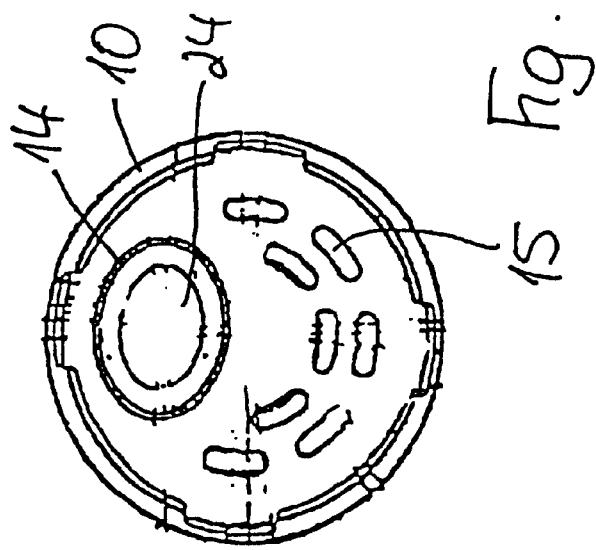
FIG. 9 is a front elevation of the gas discharge area of the subject of FIG. 8.

The exemplary embodiment illustrated in FIGS. 8 and 9 is essentially distinguished from the exemplary embodiments described in the foregoing in that the discharge part 14 projecting axially out of the housing 10 is not arranged centrally in the end 12 of the housing, but rather is embodied in an asymmetric arrangement that is offset from the central longitudinal axis of the housing 10; the discharge openings 15 that form the second partial discharge area are consequently arranged in the remaining partial surface of the end 12 of the housing 10.

The features of the subject of this document that are disclosed in the foregoing description, claims, abstract, and drawings can constitute principal features for realizing the invention in its various embodiment forms, both individually as well as in any desired combination.

What is claimed is:

1. A gas bag arrangement for a motor vehicle safety system, comprising:

a housing having a gas discharge area to which is connected an airbag;

a gas generator disposed in said housing, wherein said airbag is unfolded and inflated by gas produced by said gas generator and guided by said housing to said gas discharge area thereof; and a discharge part forming a first partial discharge area of said gas discharge area, wherein said discharge part projects from said housing into said airbag, wherein a second partial discharge area is formed by openings disposed about an attachment location of said discharge part to said housing, wherein said first and second partial discharge areas form two partial flows of gas from said gas generator that are separately directed, in the same direction, onto material of said airbag, and wherein said first and second partial discharge areas are staggered relative to said airbag as viewed in a direction of discharge of gas from said housing, wherein said discharge part that forms said first partial discharge area is asymmetrically disposed on a wall of said housing, and wherein said openings that form said second partial discharge area are formed in said wall of said housing; and a retention chamber formed in front of said first and second partial discharge areas.

2. A gas bag arrangement according to claim 1, wherein said housing has a tubular configuration, and wherein said gas discharge area is disposed on an end of said housing.

3. A gas bag arrangement according to claim 2, wherein said airbag is drawn over said end of said tubular housing and is fixed to an exterior of said housing.

4. A gas bag arrangement according to claim 1, wherein a separate gas generator is disposed in said housing, and wherein said retention chamber is formed within said housing between said gas generator and said gas discharge area.

5. A gas bag arrangement according to claim 4, wherein an end of said gas generator that faces away from said gas discharge area is provided with radial exit openings.

6. A gas bag arrangement according to claim 1, wherein said gas generator is in the form of gas-producing material that is disposed in a portion of said housing, and wherein a retaining disk is disposed between said gas-producing material and said gas discharge area to form said retention chamber upstream of said gas discharge area.

7. A gas bag arrangement according to claim 6, wherein said retaining disk is a burst disk.

8. A gas bag arrangement according to claim 4, wherein said housing, at said gas discharge area thereof, is provided with a throttling disk that faces said retention chamber.

9. A gas bag arrangement according to claim 6, wherein said housing, at said gas discharge area thereof, is provided with a throttling disk that faces said retention chamber.

10. A gas bag arrangement for a motor vehicle safety system, comprising:

a housing having a gas discharge area to which is connected an airbag;

a gas generator disposed in said housing, wherein said airbag is unfolded and inflated by gas produced by said gas generator and guided by said housing to said gas discharge area thereof; and a discharge part forming a first partial discharge area of said gas discharge area, wherein said discharge part projects from said housing into said airbag, wherein a second partial discharge area is formed by openings disposed about an attachment location of said discharge part to said housing, wherein said first and second partial discharge areas form two partial flows of gas from said gas generator that are separately directed, in the same direction, onto material of said airbag, and wherein said first and second partial discharge areas are staggered relative to said airbag as viewed in a direction of discharge of gas from said housing, wherein said discharge part that forms said first partial discharge area is centrally disposed in a wall of said housing, and wherein said openings that form said second partial discharge area annularly surround said attachment location of said discharge part to said housing; and a retention chamber formed in front of said first and second partial discharge areas.

\* \* \* \* \*